Feb. 14, 1956 — E. J. POITRAS — 2,734,658
FLUID DISPENSING APPARATUS
Filed April 14, 1950 — 8 Sheets-Sheet 1

Inventor
Edward J. Poitras
By Emery, Booth, Townsend, Miller + Weidner
Attys.

Feb. 14, 1956 E. J. POITRAS 2,734,658
FLUID DISPENSING APPARATUS
Filed April 14, 1950 8 Sheets-Sheet 2

Inventor
Edward J. Poitras
by Emery, Booth, Townsend, Miller + Weidner
Attys.

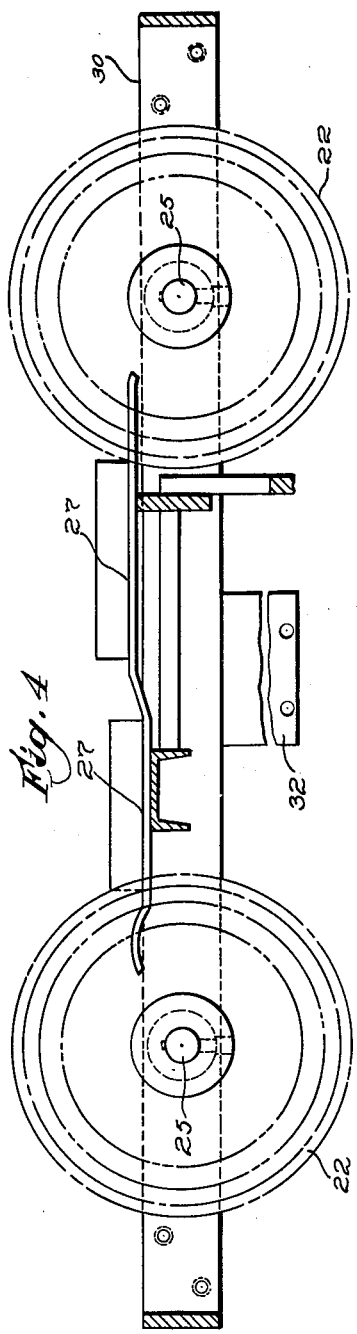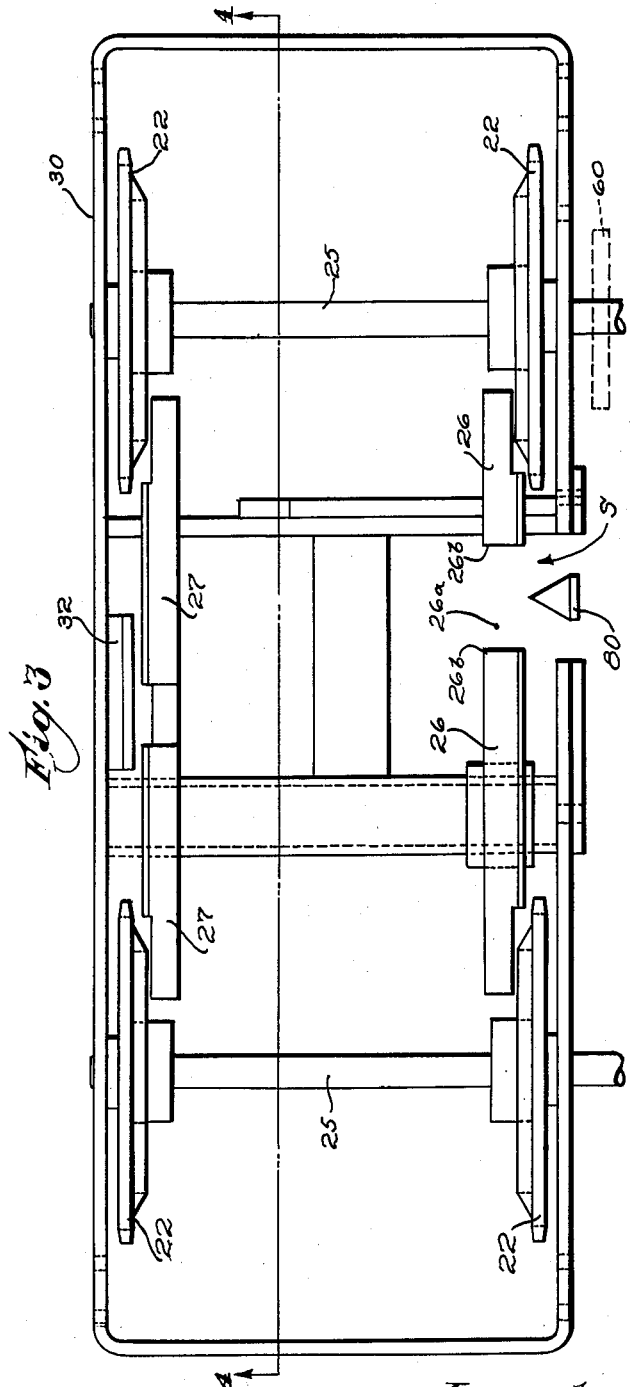

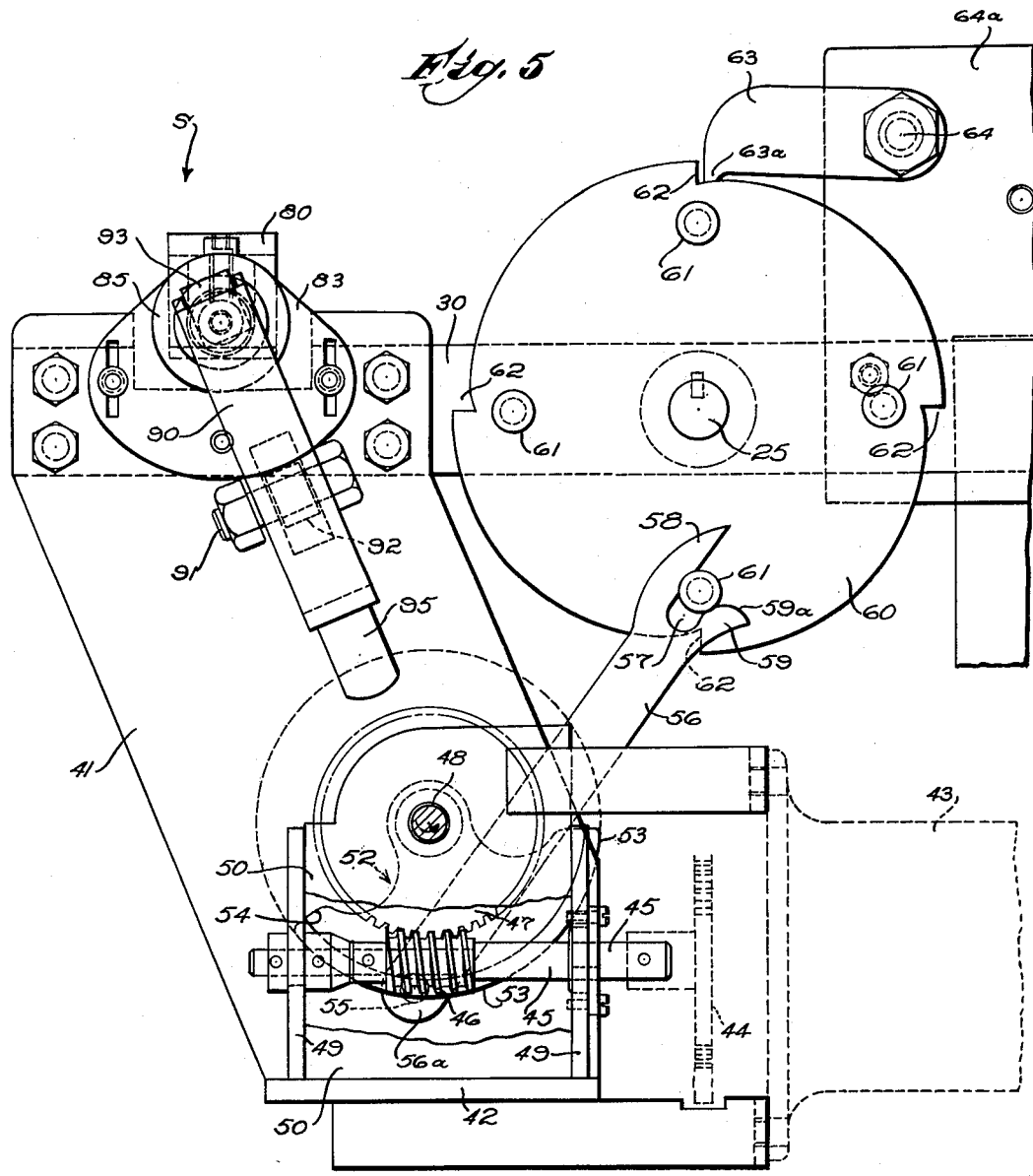

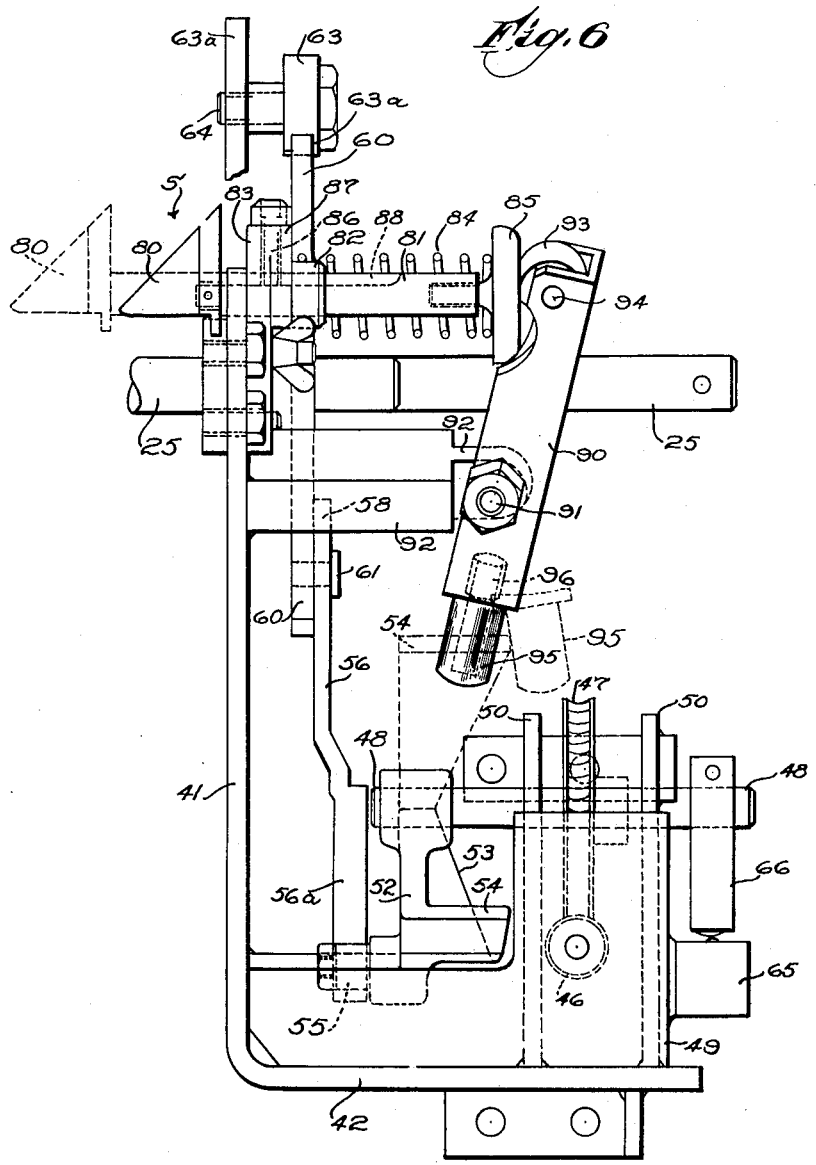

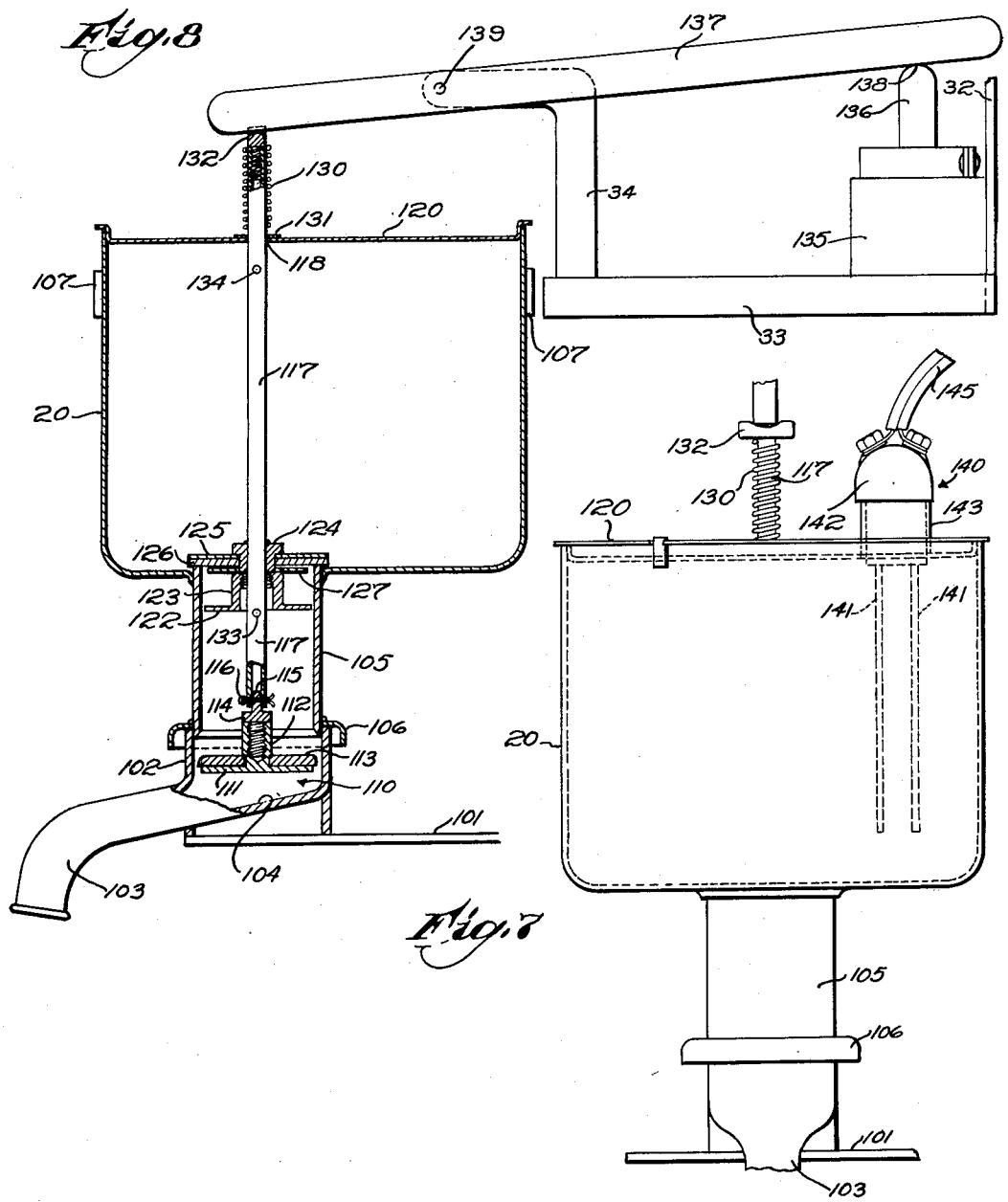

Feb. 14, 1956 E. J. POITRAS 2,734,658
FLUID DISPENSING APPARATUS
Filed April 14, 1950 8 Sheets-Sheet 7
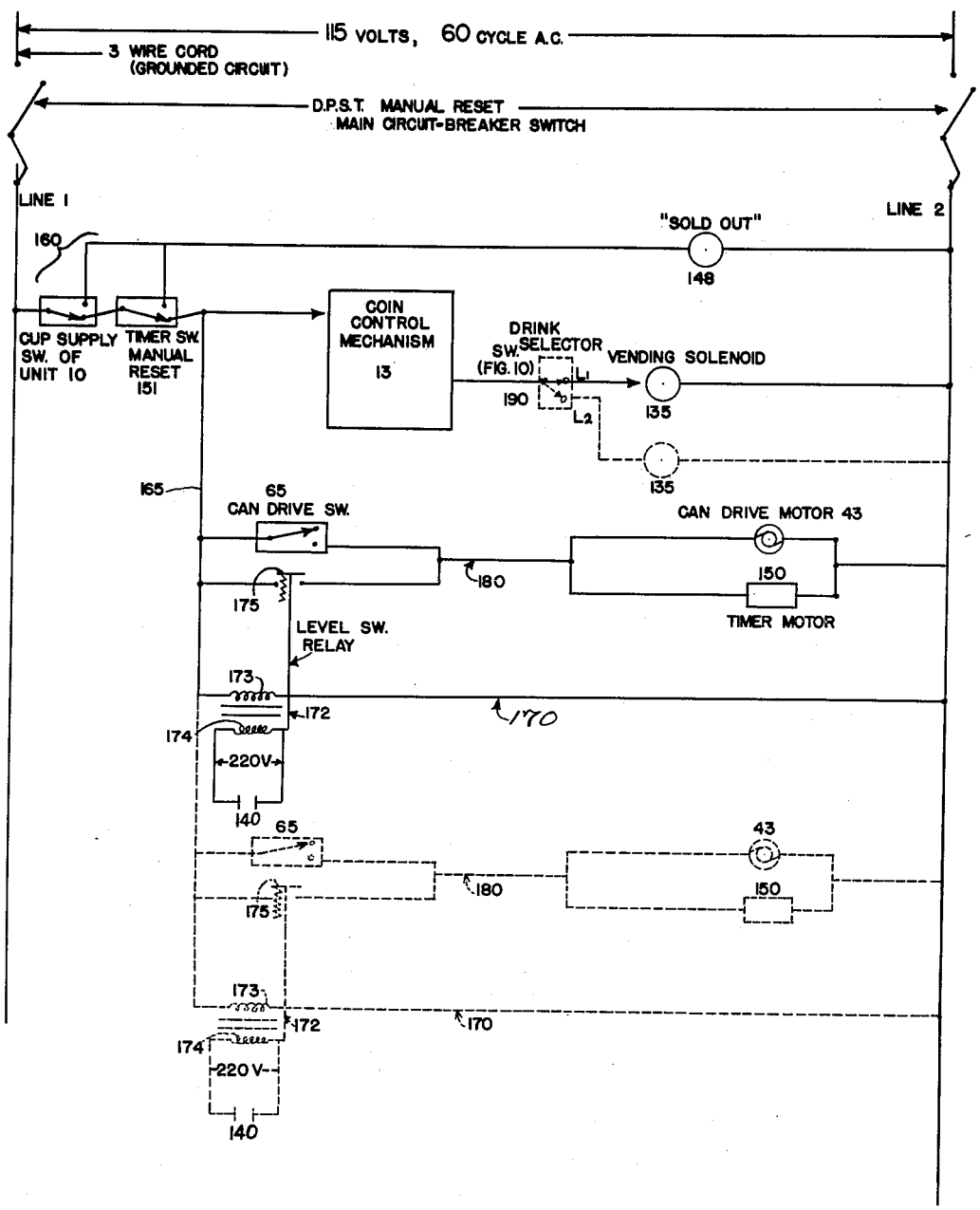
Inventor
Edward J. Poitras
by Emery, Booth, Townsend, Miller & Widner
Attys.

Feb. 14, 1956　　　E. J. POITRAS　　　2,734,658
FLUID DISPENSING APPARATUS
Filed April 14, 1950　　　　　　　　8 Sheets-Sheet 8
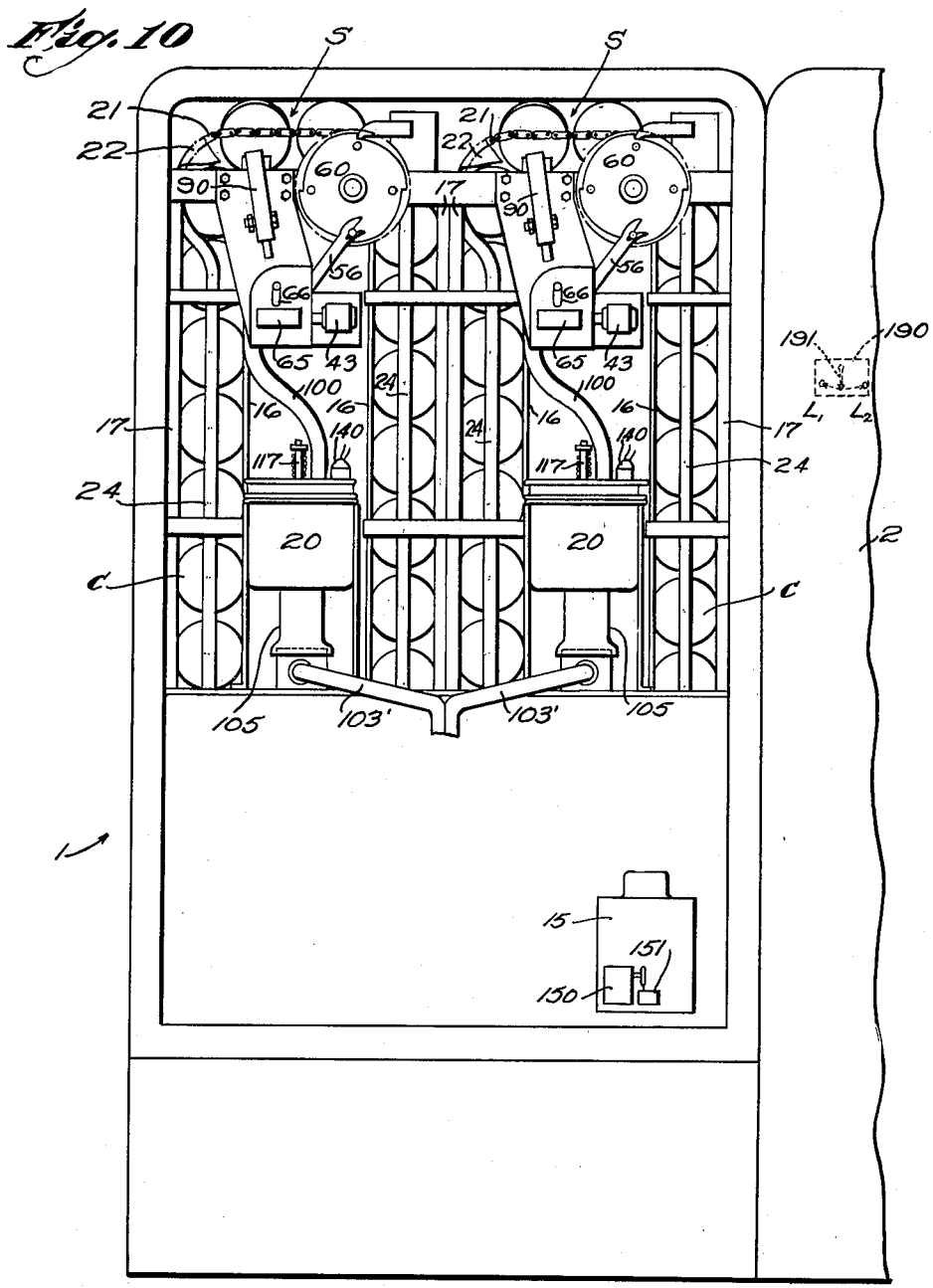
Inventor
Edward J. Poitras
by Emery, Booth, Townsend, Miller & Weidner
Attys.

United States Patent Office 2,734,658
Patented Feb. 14, 1956

2,734,658

FLUID DISPENSING APPARATUS

Edward J. Poitras, Holliston, Mass.

Application April 14, 1950, Serial No. 156,014

17 Claims. (Cl. 222—2)

This invention relates to apparatus for automatically dispensing fluids in measured unit volumes, generally under coin control. While having a wide range of utility in the field indicated it is especially adapted for handling fluids in sealed containers of more than a single dispensing unit volume, including particularly liquids for human consumption such as citrus and other fruit and vegetable juices, concentrates, milk and other beverage and food items supplied in cans or other sealed containers to be opened and the contents furnished to dispensing reservoirs with or without other admixture. In various respects it represents improvement upon apparatus such as disclosed and claimed broadly in the copending application of Robert W. Johnson, Serial No. 775,933, filed September 24, 1947, now Patent No. 2,609,982, issued September 9, 1952.

In the drawings illustrating a preferred embodiment of the invention:

Figs. 3 and 4 on a larger scale are respectively a top plan and a vertical section of the top frame assembly mounting certain can-presenting and puncturing means, Fig. 4 taken as on the line 4—4 of Fig. 3;

Fig. 5 is a front elevational view on a still larger scale of the unitary assembly comprising the can-advancing and puncturing means;

Fig. 6 is a side elevation corresponding to Fig. 5 looking from the left at said figure;

Figs. 7 and 8 are respectively a front elevation and a vertical section showing the fluid reservoir or juice pot and associated measuring valve;

Fig. 9 is a wiring diagram; and

Figure 1:
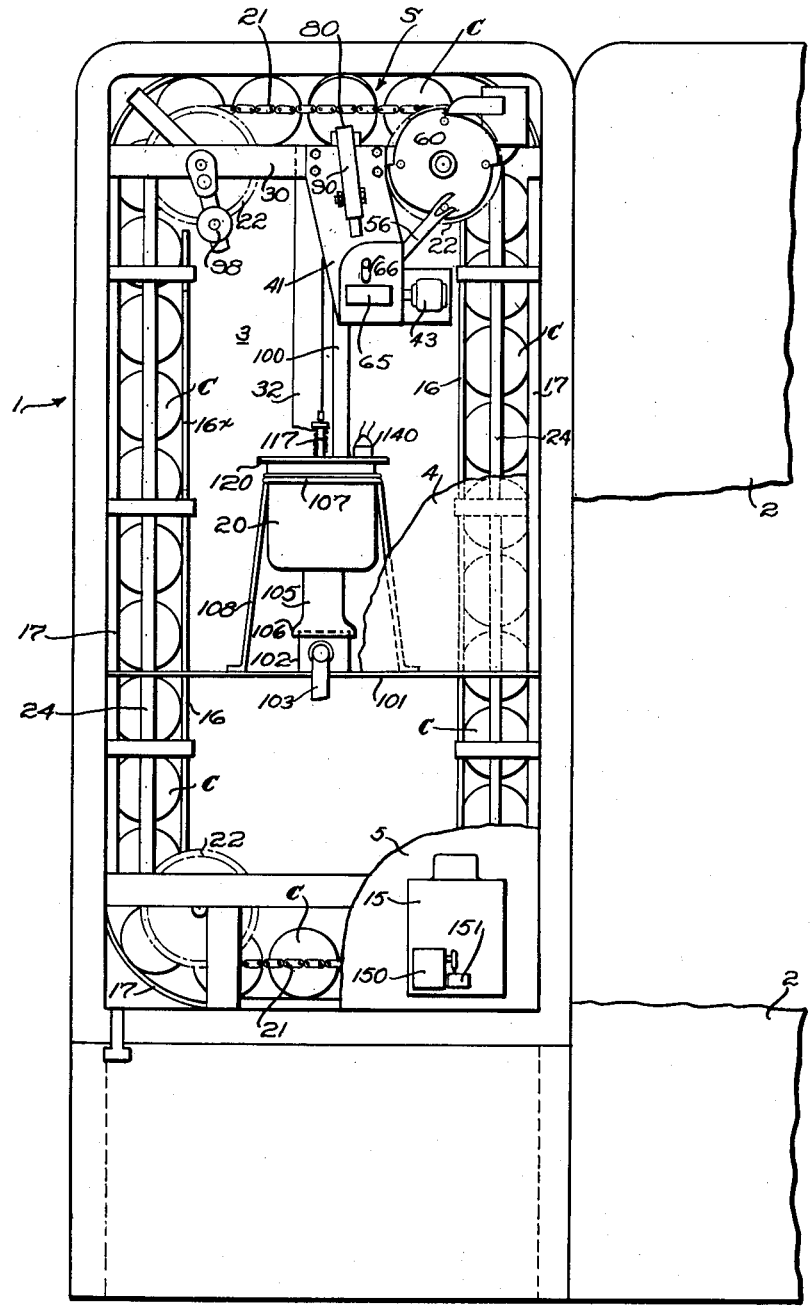
Fig. 1 is a front elevation with the outer door of the cabinet open and with inner closures removed or partly broken away to reveal the inner mechanism.

Fig. 10, corresponding generally to Fig. 1, shows a modification for dispensing one of a plurality of fluids selectively.

Figure 2:
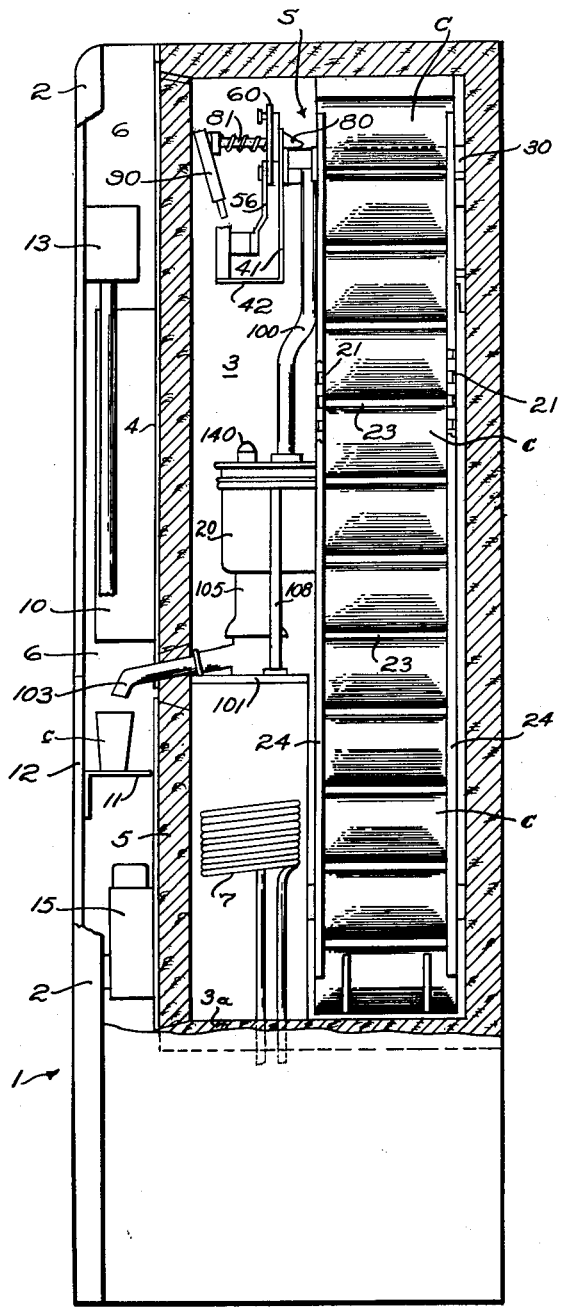
Fig. 2 is a view mainly in vertical section taken just within the right side wall of Fig. 1 with exposed parts in side elevation.

Referring first to Figs. 1 and 2 the apparatus as a whole comprises a cabinet 1 having a substantially full-height outer front door 2, shown open in Fig. 1. Within the cabinet is a main insulated and temperature-controlled compartment 3 housing the supply of sealed containers, the container presenting and opening means and the liquid collecting and dispensing provisions to be described. This main compartment 3 is closed at the front as by upper and lower inner doors or panels 4 and 5, these and the outer door 2 arranged to provide a vertical chamber between them as at 6 for the cup dispenser unit 10, the coin control mechanism 13, and an electrical control box 15, to be referred to. The temperature in compartment 3 is controlled as appropriate for the liquid to be dispensed, depending for example on whether a hot or a cold drink is to be supplied. For illustrative purposes the temperature conditioning means is referred to in terms of refrigeration and cooling, it being understood that heating means may be substituted. In the space below the bottom insulating wall 3a of the refrigerated compartment 3 is installed the electrical compression-expansion type refrigerating unit, a portion of the cooling coil of which is seen at 7 in Fig. 2. Air is circulated past the coil and throughout the main compartment 3, auxiliary fan means being provided therefor if desired.

While the improved means of the present invention is useful generally for dispensing fluids, it is especially adapted for coin controlled beverage vending. Accordingly it is shown incorporated in a complete sealed-unit handling apparatus similar in general to that of said Johnson application. The various sub-assemblies thereof include a dispensing unit for paper or other cups, as indicated conventionally on Fig. 2 at 10, herein on the inner door 4. Such unit, preferably of the type having a dual stack of nested cups, deposits a cup c in response to coin insertion, presenting it on a shelf 11 at the inner face of the front door 2. There it is available to the purchaser via an access opening 12.

The associated coin control mechanism is conventionally indicated at 13, being conveniently mounted at the inner face of the outer door 1. As in the above identified Johnson application the coin control mechanism and the cup dispenser unit may be of known or preferred design such as commercially available. These desirably include such features as coin changer means, lock-out and anti-jackpot means, and the associated relays, controls, signals and switches appropriate thereto. The lower inner removable panel 5 herein serves as a convenient mount for the electrical control box 15, Fig. 1, containing certain of the relays and other electrical devices more immediately concerned in the improved mechanism of the present invention, including a liquid level relay, vending relay, anti-jackpot relay, and a timer motor as later herein explained.

As noted, the apparatus is organized to handle a multiplicity of sealed containers, herein referred to as cans, carrying the fluid or fluid forming preparation to be dispensed. The full cans are advanced one by one as required to an opening or puncturing station at a top central location, Figs. 1 and 2. The content of the opened can is drained to a reservoir or juice pot 20, where in some instances fluid may be added to condition the item for dispensing. The level of the dispensing fluid in this reservoir determines and controls the presentation and opening of the cans, that is, means is provided responsive to reduction of fluid in the reservoir 20 to puncture a fresh can and permit the contents to be discharged into the reservoir to replenish it. Measured increments of the fluid of the reservoir are automatically dispensed as called for by insertion of a purchaser's coin.

As seen in Figs. 1 and 2 the temperature-controlled compartment 3 accommodates a substantial supply of the containers C, these being for example the large or "hotel" size cans such as 38 oz. or 46 oz. The cans in this instance are maintained in a continuous pathway or guide-track including side and end guide bars 16, 17 extending vertically at the opposite sides of the compartment 3 and horizontally across the top and bottom thereof. As viewed in Fig. 1, the cans disposed on their sides move upwardly at the right, then horizontally to the opening station indicated generally at S, the emptied cans then continuing across to and downwardly at the left.

The cans C herein are advanced step by step on and by an endless conveyor which is intermittently driven from time to time in response to the fluid volume status in the reservoir 20. The endless conveyor itself may be generally similar as in the identified Johnson application, comprising a pair of pivoted link chains 21 spaced depthwise of the cabinet appropriately to support the cans lengthwise between them. These conveyor chains pass around corresponding pairs of sprockets 22 at the four corner regions of the compartment, one being seen at the upper left in Fig. 1 and another at the upper right partly obscured by the advancer disc 60, to be described, see also Fig. 3. Horizontal spacer rods 23 fixed on the chains in the manner of ladder rungs define individual can positions. At least the vertical runs of the conveyor chains 21 are guided in chain tracks 24.

In accordance with the invention the entire intermitting drive mechanism for the described can advancing means and herein also the puncturing means for opening the cans is constructed and arranged as a single compact assembly unit disposed in ready accessible position, herein near the top of the cabinet interior. This mechanism is generally shown at the upper portions of Figs. 1 and 2, and in more detail in Figs. 3 to 6.

Referring now more particularly to Figs. 3 and 4, the upper conveyor sprockets 22 and the top horizontal runs of the conveyor 21 together with the drive mechanism and the puncturing means to be described are mounted on a rectangular frame 30 near the top of compartment 4, seen in plan in Fig. 3 and in side elevation in Fig. 4; see also Fig. 1. This frame 30 carries parallel shafts 25 rotatably supporting the upper chain sprocket pairs 22. It also presents a horizontal top track for the cans by means of front and rear angle bars 26, 27. The track bar 26 at the front is interrupted, as at 26a, for a distance less than a can diameter, with adjacent portions at the gap or recess turned down as at 26b, 26b. This provides a positive locating means for a can arriving thereat and defines the can-opening, puncturing or punching station S, Fig. 3. The punch, cutter or puncturing element at this station S is indicated at 86; see also Figs. 5 and 6.

At this puncturing station S the cans are tilted downward at the front to assist in draining the contents; the can front end is lowered by reason of the seating recess 26a of the front track 26, the can rear end meanwhile being held at a somewhat higher level by the corresponding portion of the rear track bar 27, which may be somewhat elevated for the purpose; Fig. 4. Beyond the puncturing station S, toward the left on Figs. 3 and 4, both tracks 26, 27 assume a uniform level and direct the punctured and drained cans across to the other (left) side of the compartment 3 where they pass to the down run of the conveyor thereat.

The intermittent can advancing means responsive to the determined minimum quantity of fluid in the reservoir 20, together with the can-puncturing means including the punch 80 referred to are also mounted on the frame 30. Such advancing means comprises the advancer disc 60 previously mentioned; Figs. 1, 3, 5 and 6. This is fixed on the shaft 25 of the upper right pair of chain sprockets 22. It is herein designed and proportioned relative to the can conveyor so that a one-quarter turn of the disc 60 will advance the conveyor and can series thereon through one can position, removing the preceding opened and drained can and presenting the next filled and sealed can at the opening station S.

The drive means for the conveyor-operating advancer disc 60 is unitarily supported on a bracket 41 hung on the front cross piece of the assembly frame 30. The drive unit comprises a motor 43 with reduction gearing terminating in a drive gear 44, Fig. 5, removably connected to the shaft 45 of a worm 46 driving a worm gear 47 fast on a cam shaft 48 paralleling the shaft of the advancer disc 60. The worm shaft 45 and the cam shaft 48 at right angles thereto are journalled in pairs of upright bearer plates 49 and 50 on the horizontal foot 42 of the bracket 41 there forming a frame or housing for the conveyor drive parts mentioned.

At the inner end of the cam shaft 48, noting particularly Fig. 6, is fixed a face cam 52 the inclined cam surface 53 of which extends about 120° around the cam shaft 48 and terminates in an abrupt drop as at 54. The motor and described gearing drives the cam shaft 48 and cam 52 counter-clockwise as viewed in Fig. 5.

At the back of the cam 52 near the outer margin is a crank pin 55 having pivoted on it the lower end of a pitman-like advancer link 56 adapted to impart rotation to the advancer disc 60 in quarter-turn steps. For cooperation with the link 56 the advancer disc 60 has a series of drive studs 61, one at each quadrant. The upper end of the advancer link 56 is forked as at 57 to provide it with an upper finger 58 and relatively shorter thumb piece 59, the latter having a curved surface as at 59a to facilitate longitudinal engagement of the link 56 with a stud 61. Under counter-clockwise rotation of the cam 52 and crank pin 55 thereon from the position as shown in Fig. 5 it will be seen that the link 56 is thrust upwardly and toward the right thereby to turn the advancer disc, also counterclockwise, through one step, herein 90°.

The link 56 is proportioned and arranged so that one up stroke thereof affords the desired one-quarter revolution of the advancer disc 60. As best seen in Fig. 6 the upper portion of the link 56 is disposed flatwise adjacent the outer face of the advancer disc 60 while its lower portion is offset as at 56a thereby permitting the next approaching stud 61 of the advancer disc to pass behind the link. During the reverse down stroke of the advancer link 56 it retreats from the stud 61 which it has just advanced to the right central position on Fig. 5. The under edge face of the link rides back over the top of the next stud 61 newly presented at the bottom position, until the thumb piece 59 drops off from the stud and the longer finger 58 falls onto it. The link 56 then is ready for the next advancing stroke, substantially as shown in Fig. 5. The advancing disc 60 has peripheral notches 62 to receive the nose 63a of a locking dog 63 pivoted as at 64 on a bracket 64a on the assembly frame 30. This dog rides on the edge of the advancing disc 60 and drops into each succeeding notch 62 to lock the can conveyor against reverse movement. Actuation of the conveyor in the described manner takes place within about the first 120° or one-third revolution of the cam shaft 48.

The active status of the cam conveyor drive motor 43 is determined by a micro-switch 65, Fig. 6, mounted on the front drive support plate 50 in position for actuation by a motor switch cam 66 adjustably fixed at the outer end of the cam shaft 48. One full rotation of the latter constitutes one operating cycle of the can advancing conveyor and the can puncturing and fluid draining mechanism. The micro-switch 65 is of the normally closed type. It is arranged to be opened and held open by the motor switch cam 66 upon completion of each such cycle, with the parts positioned as in Figs. 5 and 6. If at the end of any such supplying cycle the quantity of the fluid in the reservoir 20 has been brought to the determined amount the next operating cycle awaits further call by depletion of the reservoir liquid. But if the contents of more than one can is required to restore the reserve quantity in the reservoir a relay controlled by the liquid status detector 140, to be referred to, immediately initiates a further supply cycle.

The can puncturing or punching operation takes place immediately on presentation of the new full can at the puncturing station S, and occupies approximately the second one-third of the operating cycle represented by one full turn of the cam shaft 48.

The opener or punch means, again noting Figs. 5 and 6, also is mounted on the bracket 41 already mentioned, above the conveyor drive means thereon. It comprises a horizontal shank 81 slidable toward and from the can track in a guide collar 82 on a mounting plate 83 removably attached at the upper front face of the bracket 41. The punch proper, cutter or puncturing element 80 is replaceably attached at the inner end of the punch shank 81, at the left in Fig. 6. A coil spring 84 surrounding the punch shank 81 and bearing between the mounting plate 83 and the operating head 85 of the punch normally holds the latter retracted as in Fig. 6. A punch guide pin 86 held in a boss 87 on the guide collar enters a longitudinal guide slot 88 in the shank 81 of the punch to hold it against rotation.

The punch 80 is adapted to be thrust inwardly, toward the left in Fig. 6, to puncture a presented can, herein by means of a rocker arm 90 shown as a U-bar pivoted at an intermediate point as at 91 upon a post 92 extending from the main bracket 41 and received in the channel of said arm. At the upper end of this rocker arm 90 a cam-like thrust member 93 is turnably mounted between the channel sides as at 94 and having an eccentric portion for thrusting and rolling contact with the outer face of the punch head 85. The lower end of the rocker arm 90 carries a cam roller 95 on an axis defined by a pin 96 extending lengthwise of the rocker arm.

Said lower cam roller 95 of the rocker arm 90 is disposed to be picked up by the inclined surface 53 of the face cam 52 during rotation of the cam shaft 48. As the roller 95 rides the face cam incline the lower end of the rocker arm is thereby forced to the right in Fig. 6, thrusting the upper end inwardly to the left in said figure and driving the punch 80 toward the can track to pierce the particular can which has been moved into position at the station S. At the abrupt drop 54 of the face cam the rocker arm roller 95 is released so that the punch spring 84 is free to withdraw the punch point 80 abruptly from the can, the rocker arm swinging back to the Fig. 6 position, or if preferred the punch may be positively driven in both directions as by a push-pull connection with the operating cam. As noted this container-opening operation takes place during approximately the second one-third of the total cycle defined by one revolution of the cam shaft 48. Then the succeeding final one-third of the cycle affords time for the fluid content of the opened can to drain into the reservoir or juice pot 20.

Referring now to Figs. 1 and 2, it will be understood that in setting up the apparatus for operation a complement of sealed cans is installed on the endless conveyor 21—23. In the illustrated example the latter has a capacity of some twenty-eight cans disposed in line, these generally being of the relatively large size as noted. For loading and unloading purposes one section of the can track 16, 17 is removable, for example the inner side rods at the upper left portion in Fig. 1 as indicated at 16x. At such point the empty cans may be removed and replaced by another supply of full cans. For manually moving the conveyor at such or other times one of the sprocket shafts 25, for example that at the upper left in Fig. 1, is provided with a hand crank and reversible ratchet device 98 engageable with the sprocket and arranged to prevent undesired back travel of the conveyor while permitting it to be shifted in either direction as convenient for loading, the automatic dog 63 at such time being raised out of action.

From the foregoing it is apparent that successive full cans of the juice or other liquid are brought one by one to the opening and emptying station S. There each can rests, desirably in the tilted position described, at least long enough to permit substantially complete drainage of the content. Such drainage pause as noted occupies about the last one-third of each cycle of the can-presenting and puncturing mechanism. From each opened can at station S the liquid content drains into fill tube 100, Figs. 1 and 2, and through it to the juice pot 20.

In accordance with the invention simplified and otherwise improved liquid unit measuring and dispensing means and liquid supply detecting means are provided in association with the juice pot.

As illustrated in detail in Figs. 7 and 8, the reservoir or juice pot 20 in the main compartment 3 is constructed and arranged for ready removability. It receives main support from a shelf 101 at the lower front of the refrigerator compartment, which shelf carries an open top spill cup 102 having a spout 103 extending laterally and downwardly to the front of the machine. Within the spill cup 102 an inclined bottom wall 104 spaced substantially below the open top of the cup directs the fluid to the receiving end of the spout 103. The mouth of the latter stands vertically over the position at which the drinking cups are, under coin control, automatically deposited on the delivery shelf 11 already mentioned.

Fixed on and opening through the bottom wall of the juice pot 20 is a tubular measuring chamber and valve housing 105 of an outer diameter receivable within the top rim of the spill cup 102. The measuring chamber 105 has an external skirt 106 dimensioned to seat freely on the rim of the spill cup, there providing vertical support for the juice pot assembly as a whole. Radial location for the juice pot is afforded by a clamp ring 107 slidably receiving the pot and itself mounted on a stand 108 fixed on the shelf 101 already mentioned. Thus the entire juice pot and measuring means may be lifted off from the spill cup 102 and up through the locating collar 107 for cleaning and replacement at any time.

The measuring and dispensing valve means as illustrated in Fig. 8 comprises a valve 110 operable vertically at the lower end of the measuring chamber 105 between an up closing position and a down open or dispensing position as there shown. The valve 110 includes a foot plate 111 with integral central stem 112 and a concentric gasket 113 fixed about the base of the valve stem and supported on the foot plate 111. This gasket 113 is proportioned and shaped for sealing closure of the bottom delivery mouth of the measuring chamber 105. The valve stem has centrally tapped into it a connector 114 the top post 115 of which loosely enters and is detachably secured as by a cotter pin 116 to the lower end of a hollow actuator rod or tube 117 extending up through the measuring chamber 105 and vertically through the juice pot 20 so as to project above the top of the latter. It passes slidably through an aperture 118 in a lid 120 removably covering the top of the juice pot 20.

The measuring valve means further comprises a plunger 122 having a collar 123 received on a shouldered screw 124 fixed at the appropriate level on the actuator rod 117. The plunger and screw also carry a top closure element for the measuring chamber, herein comprising a top plate 125 upwardly abutting the shoulder of the screw 124 and overlying an upper gasket 126. The latter is supported by an under plate 127 of reduced diameter receivable within the measuring chamber 105. The upper gasket 126 and its top plate 125 are of sufficiently larger dimension to seat on the top rim of the measuring chamber which is spaced above the bottom wall of the juice pot for this purpose. Thus in the drink or liquid unit dispensing position of Fig. 8 any remaining liquid in the juice pot is temporarily closed off from the measuring chamber, so long as the dispensing valve 110 at the bottom thereof is in the open position shown.

The actuator rod 117 normally is elevated by a coil spring 130 surrounding its upper end and bearing between a washer 131 on the juice pot lid 120 and a yoke 132 at the top of the rod. Down movement of the actuator rod 117 for a dispensing operation opens the valve 110 at the bottom of the measuring chamber 105 and closes off the top thereof by the upper gasket 126. Conversely, return up travel of the actuator rod 117 closes the bottom and exposes the top of the measuring chamber 105. Thus between dispensing operations, and so long as fluid is supplied to the juice pot 20, the measuring chamber 105 stands filled with a measured quantity of the fluid in readiness to be dispensed.

The disc-form measuring valve 110 is radially spaced from the inner wall of the spill cup 102 and in the open position of Fig. 8 remains substantially above the bottom 104 thereof. Thus the measured fluid as released from the measuring chamber falls freely and is distributed circumferentially by the valve in a curtain-like form wherein it receives ample contact with atmospheric air for aerating purposes.

Rapid release of the measuring chamber content is prompted by venting afforded by the hollow formation of the actuator rod 177. Near the lower end the latter has one or more radial ports 133 open to the chamber 105. At an upper portion, above the maximum level of the fluid content in the pot 20, the actuator rod 117 has other radial ports 134. Thus a venting passage is provided from the chamber 105 to the upper region of the pot 20.

The operating means for the dispensing valve further comprises an electro-magnetic device or dispensing solenoid 135, Fig. 8, located adjacent the juice pot 20. Desirably the solenoid and associated valve operating lever 137 are comprised in the assembly of parts supported on the assembly frame 30, as by means of a strap 32 hung from the rear of the frame, see Fig. 4, and having a foot 33, Fig. 8, on which the solenoid 135 is set. As shown in Fig. 8 the armature 136 of the dispensing solenoid 135 is in the energized position, elevated. Hence the adjacent end of an operating lever 137 movably engaged by the armature as at 138 is lifted and the opposite end is depressed. This lever 137 is rockably supported, preferably nearer the end remote from the solenoid for better advantage therefrom, as at 139 on an arm 34 on the stationary foot 33 mentioned. The shorter end of the lever extends over the top yoke 132 of the actuator rod 117, preferably without positive attachment for ease in removal of the juice pot or the lid 120 thereof. Hence it exerts a positive down thrust on the valve actuator rod 117 on energizing of the dispensing solenoid 135, and is returned in the up valve-closing direction by the spring 130 when the solenoid is de-energized.

The detector element for determining the liquid level in the pot 20 also is herein included in the juice pot and dispensing valve assembly, and is itself removably associated in the latter, being in the example shown installed on the lid 120. Such element as designated generally at 140, Fig. 7, is of an immersion form of circuit maker, comprising a pair of spaced probes or wires 141, 141 of good electrical conductive material not harmfully affected by the expected fluid, such as a stainless steel. These are held in a plug-like head of insulation 142 received in and shouldered to seat on a collar 143 on the pot lid 120 surrounding an opening therein through which the probes 141 of the detector element 140 project down into the pot 20.

These probes or contact members 141, which may be threaded or otherwise vertically adjustably held in the insulator 142 extend down to a selected minimum level for fluid in the pot 20 determined as appropriate for calling replenishment. The outer ends beyond the insulation 142 are connected to lead wires 145 from the secondary winding of a transformer relay—to be referred to in connection with the wiring diagram Fig. 9—furnishing a selected voltage, as for example 220 volts. Whenever liquid is present in the pot 20 to a level touching or submerging the conductive probes 141 a closed detector circuit is maintained. Drop in the reserve supply of liquid in the pot to a level below the conductors breaks such circuit and through relay means calls a cycle of the can-advancing and opening means described. The described detector means 140, 141 is illustrative, it being apparent for example that a single probe may be employed and the pot itself insulated and connected to provide one side of the detector circuit.

If for any reason one such can-handling cycle signalled by the detector fails to replenish the pot to a level reestablishing the detector circuit at the probe detector element 140, a second cycle of the can-advancing and puncturing means is called and takes place. This reservoir replenishment detector 140 preferably is set so that normally a quantity of liquid equivalent to a plurality of drinks or measurement units is left at the replenishment call level, one in the measuring chamber 105 and enough more liquid at the bottom of the pot 20 to take care of the largest number of measurement units which could be dispensed while another sealed container is being advanced, punched and drained, even under coin insertion at the maximum rate. The reservoir or pot 20 has a preferred capacity of something over the equivalent of two full container or can contents, below the level of the upper radial ports 134 in the actuator rod 117. In other words, continuous sales may be made, even during a container advancing, opening and draining cycle. For example, the illustrated apparatus may be operated on a dispensing or drink cycle of about six seconds, and a container handling cycle of about thirty-seven seconds. By setting the liquid level control to call replenishment when the reservoir supply is diminished to approximately six measurement units or drinks, including the one in the chamber 105, a replenishing cycle will have been substantially completed before the remnant liquid (six units) available at the start of that replenishing cycle can be dispensed; six dispensings each taking six seconds equals thirty-six seconds, approximately the same as the can advancing, opening and draining cycle of thirty-seven seconds.

Under the invention means is provided whereby inadequate replenishment of the juice pot 20 at the end of a plurality of immediately succeeding can handling cycles, each including the advancing, puncturing and draining phases, causes the machine to be shut down and effects a "Sold out" signal such as the lighting of lamp 148, Fig. 9. Ordinarily, with the large size can and with an unopened supply thereof on the conveyor, a single cycle or at most a double cycle of the can handling mechanism, depending on dispensing traffic, brings adequate replenishment of the juice pot 20.

Occasionally a careless attendant may skip a can position on the conveyor when servicing it, but in general the occurrence of two successive "empty" cycles at the opening station without re-establishing the detector-actuating liquid level in the juice pot signifies exhaustion of full cans on the conveyor. Such occurrence of a determined plurality of successive can handling cycles, whether two or more are selected, without resultant replenishment of the juice pot is herein employed for automatically shutting down the machine until an attendant has serviced it, removing emptied cans and installing a complement of full cans on the conveyor.

For this purpose I herein employ a timer or interval measuring switch incorporated in the machine, conveniently located for example on or in the panel or control box 15, Fig. 1, as diagrammatically indicated at 150. Such timer is of a recycling type, automatically returning to zero time or starting position whenever it is stopped short of the determined maximum time period. It preferably is electrically operated as by a synchronous motor and includes a switch 151 having a normally closed position and adapted to be opened, subject to manual resetting, upon uninterrupted running of the maximum operating interval for which the timer is set.

As stated, in the present example the can handling cycle comprises the three phases of can advance, can puncturing and can drainage, and corresponds to one complete revolution of the cam shaft 48. This may occupy for example about 37 seconds. The output shaft of the timer motor 150 is arranged to make but a fractional revolution, say 120°, during such one-cycle period. If at the end of the single can-handling cycle the liquid level detector 140, 141 at the juice pot still calls for replenishment, a second can cycle is immediately instituted and the timer continues to run. For some installations, generally depending on the size of cans, one or more additional cycles may be permitted. Assuming here that two can cycles are adequate, then after the expiry of a two-cycle time equivalent plus some allowance for lag, say for example a total of 80 seconds, the output shaft of the timer motor 150 has turned to a point, say about 260° in the example, to open the adjustable timer switch 151. This shuts down the machine and puts on the "Sold out" lamp 148. The timer switch is manually reset after the can conveyor has been serviced with full cans.

The time-controlled switch 151 herein also serves the important function of shutting down the machine and lighting the "Sold out" lamp 148 whenever the can handling mechanism actuated by the drive motor 43 fails in or is prevented from advancing or punching a can. Should the service attendant carelessly insert in the conveyor track a badly damaged can the handling mechanism may sometimes become jammed, or fouling may occur in some manner. Resultantly the replenishment call from the juice pot 20 is not answered. Hence after expiry of the time equivalent of two can handling cycles plus leeway, some 80 seconds in the foregoing example, the timer motor 150 throws the switch 151, the machine shuts down and the "Sold out" signal goes on. As noted later with reference to Fig. 9, a similar shut down and "Sold out" signalling is provided for in the event of exhaustion of the supply of drinking cups. Thus the machine is stopped and the customer warned and the coin lock-out rendered effective if there are no cups or no liquid, whether the latter event be due to exhaustion of the can supply on the conveyor or to malfunctioning or inoperativeness either in the can advancing or the can punching phases.

The schematic wiring diagram of Fig. 9 illustrates the operative relation of the main electrical elements of the present invention. Circuits concerned primarily in the coin control aspect of the vending are not shown, being unnecessary to an understanding of the instant invention. These may be generally similar as in the copending Johnson application identified, so that the coin handling assembly 13 is equipped for slug rejection, coin change making, for operation by only one type of coin (e. g. nickels only) when change is not available, and for locking out or rejecting coins inserted while a vending cycle is in progress, as well as for preventing "jack-pot" release of coins, and cooperating with the "Sold out" indication.

As indicated on Fig. 9 the power supply may be the usual 115 volts, 60 cycle A. C. current. The machine preferably employs a grounded circuit, being arranged to be plugged in to the main supply via a three-wire cord including a grounded line and two live lines designated "Line 1" and "Line 2" on the diagram, across which the several circuits are disposed. To take care of overloads the lines 1 and 2 lead in through a double pole single throw circuit-breaker switch, in lieu of fuses, this being of the manual re-set type re-establishing the circuit by a push-button.

The "Sold out" signal or lamp 148 is disposed in a master circuit 160 with the cup supply switch of the cup dispenser unit 10, normally closed and so held by the presence of a cup of the stack supply, and with the manual re-set timer switch 151 which also is normally closed subject to availability of the liquid and operativeness of the can handling mechanism. Each of the several operating circuits including the can-handling circuits of the diagram, the vending solenoid 135 and the coin control and vending circuits not shown in detail, extend in serial relation through said cup controlled switch and the timer switch 151, both normally closed. Opening of either of these switches accordingly opens the sub-circuits and shuts down the machine, simultaneously lighting the "Sold out" lamp 148.

The vending solenoid 135, whereby the liquid-measuring valve means 110 is operated to dispense one drink unit into a furnished cup, is responsive to normal operation of the coin control mechanism 13 under insertion of the proper coin. As schematically shown on Fig. 9 said mechanism and vending solenoid 135 are subject to the above master circuit 160.

The circuits of the liquid level detector device 140 and of the can handling mechanism are arranged between a lead 165 from the closed sides of said cup and timer switches, and the line 2. The liquid level detector circuit 170 includes a transformer and relay means 172 having a primary coil 173 and an associated secondary coil 174, the latter of which furnishing say 220 volts across the probes 141 of the liquid level detector. So long as liquid is present in the juice pot 20 to a level immersing the probes 141 the detector circuit thus established thereat holds open the level switch relay 175 in the can-handling circuit 180. This latter includes the can drive seal-in switch 65 adjacent the conveyor and punch drive motor 43, opened by the switch cam 66 at the end of each can-handling cycle. Said drive motor 43 is serially disposed in the circuit 180, as is also the timer motor 150 in shunt relation with the drive motor 43.

From the foregoing in connection with the drawings it is apparent that whenever the liquid level in the pot 20 drops below the probes 141 interruption of the detector circuit across them causes the level switch relay 175 to close. This establishes the circuit 180 through the drive motor 43 of the can-handling mechanism, and at the same time starts the timer motor 150. With starting up of said drive motor 43 the switch cam 66 moves off from and permits closing of the seal-in and cycle-providing microswitch 65 which thereby provides for at least one complete revolution of the can-controlling cam shaft 48. Under normal operation, unopened cans being available on the conveyor, and the drive motor 43 being through the timer motor 150 subject to a repeated cycling if needed, the liquid level is restored in the pot 20, re-creating the detector circuit across the probes 141. Such restoration of the liquid level accordingly effects opening of the level switch relay 175 and the cutting out of the drive motor 43 at the end of the single or double cycle as the case may be. Under such normal operation the timer motor 150, being in the circuit 180 controlled by the level switch relay 175, does not run long enough to measure off the elected shut down or "Sold out" period (80 seconds in the described example), but is cut out and automatically re-cycles to the zero position. The associated timer switch 151 hence remains closed, with everything in the normal condition diagrammed on Fig. 9 ready for subsequent coin-controlled dispensing operations.

The invention is equally aplicable to the selective dispensing of one of a plurality of liquids as in the example illustrated in Fig. 10 where similar reference numerals indicate like parts as in the previous views.

The cabinet 1 of Fig. 10 having an outer door 2 accommodates one or more additional or supplemental reservoirs 20, each replenished from a corresponding supply of sealed containers or cans C traveling in pathways defined by guides 16, 17 along which carrier chains 21 take the cans through the respective opening station S. The cans in the plural supplies are advanced according to replenishment needs for the corresponding reservoir 20 as called by the detector means 140 thereat. They are individually presented, opened and drained at the corresponding station S by the cycling drive and punching units of the selected can supply, there being a drive motor 43 and associated cam means operating an advancer disc 60 and punch actuator 90 for each can supply; see also the dotted showing on Fig. 9.

Selection of the desired liquid, as for example, orange juice or grapefruit juice, flavored or unflavored milk, or other plurality of beverage or other fluids, is made by the purchaser as by means of a liquid drink selector switch 190 on the outer door 2. By moving the pointer or selector member 191 of such liquid selector switch to the appropriately marked position such as $L_1$ or $L_2$, Figs. 9 and 10, the preselection of the liquid is readily made at the customer's choice. Such selector switch 190 shown dotted on the diagram Fig. 9 determines which of the plurality of vending solenoids 135, one for each reservoir 20, is to be activated under the common coin control mechanism 13 and other vending equipment such as previously described. Appropriate circuits for the container handling means and the reservoir depletition detector means for one additional liquid are indicated by the dotted showing at the lower portion of Fig. 9. The customer-operated liquid selector switch 190 is interlocked in known manner with the coin mechanism so that after a coin is inserted the selector switch setting may not be changed until the vending cycle is completed. As seen in Fig. 10 the liquid dispensing outlets 103', 103' from the different reservoirs 20 are directed to a common delivery point so as to serve into a cup c from the common cup dispensing means 10, Fig. 2.

My invention is not limited to the particular embodiments thereof illustrated and described herein, and I set forth its scope in my following claims.

I claim:

1. For liquid dispensing apparatus supplied from sealed containers on an endless conveyor presenting them one by one to a drainage opening punch at a draining station, a conveyor and punch operating assembly comprising a motor and connected drive shaft, operating connections between the drive shaft and the conveyor to advance the latter one container-presenting step during a first partial rotation of the shaft and to leave it at rest during the remainder of a full shaft rotation constituting an operating cycle, actuating connections between the drive shaft and the punch for effecting drainage-opening-punching operation of the punch during a succeeding intermediate portion of such cycle, the remainder of the cycle affording a drainage period for the punch-opened container, and frame and bracket means for unitarily mounting said operating assembly adjacent the draining station, said motor being connected in a circuit including an automatic re-cycling timer cut-off switch adapted to measure an interval equivalent to a plurality of immediately successive operating cycles, said switch automatically re-cycling without affecting the motor under normal single-cycle functioning of the conveyor and punch and acting to stop the motor on failure to obtain liquid from the draining station in the course of such plurality of operating cycles.

2. For liquid dispensing apparatus according to claim 1 the construction including a "Sold out" signal device and circuit means associated with the timer cut-off switch to cause signalling by said device in conjunction with stopping of the motor by said switch, the latter adapted for manual re-setting by a service attendant.

3. Liquid dispensing apparatus according to claim 1 including a liquid collecting reservoir, means to determine depletion of the reservoir liquid and relay means controlled thereby to start the motor, a seal-in switch for the motor, and a switch-operating cam moving with the drive shaft and adapted to open the seal-in switch and stop the motor at the end of each operating cycle subject to re-starting by the relay means should liquid depletion then still be determined.

4. Liquid dispensing apparatus according to claim 3 wherein the motor circuit includes an automatic re-cycling timer cut-off switch adapted to measure an interval equivalent to a plurality of immediately successive operating cycles, said timer cut-off switch connected to stop the motor and to shut down the dispensing apparatus should the determining means still indicate liquid depletion after such plurality of operating cycles, said timer cut-off switch constructed and arranged for automatic recycling without affecting the motor should normal liquid replenishment occur as a result of any of such plurality of operating cycles within the timing interval.

5. Liquid dispensing apparatus according to claim 4 including a "Sold out" signal device and circuit means associated with the timer cut-off switch to cause signalling by said device in conjunction with shut down of the apparatus by the timing switch, and the latter being adapted for manual re-setting.

6. In dispensing apparatus including an enclosing compartment wherein liquid is to be supplied from sealed cans on a movable conveyor, a can advancing and puncturing assembly comprising a drive shaft, a motor to drive the shaft, a rotary drive element for the conveyor, intermittent drive connections between the drive shaft and said element to advance the conveyor a single can-presenting distance during a first partial rotation of the drive shaft, a can punch, punch actuating means operable by the drive shaft for causing the punch to puncture a presented can during a succeeding partial rotation of the drive shaft, said conveyor drive connections and punch actuating means mutually so related to the drive shaft as to leave during the remainder of each full rotation of the drive shaft an inactive period for can drainage purposes, said can advancing and punching assembly being unitarily constructed and arranged for compact mounting in the enclosing compartment of the apparatus, and a supporting frame for there unitarily removably mounting said assembly in the enclosing compartment of the apparatus.

7. In apparatus for dispensing liquid from sealed cans, an endless conveyor equipped to move sealed cans one by one to an opening station, a supporting frame mountable at such station, and intermittent drive means for the conveyor carried by the frame, said means comprising a drive shaft, a motor therefor, an advancer disc connected to move the conveyor and having a concentric series of equi-spaced thrust-receiving members, a crank on the drive shaft, and an advancer link pivoted at one end to the crank and formed at the other end for advancing engagement with successive thrust-receiving members of the advancer disc thereby to give the latter a determined partial rotation and the conveyor a corresponding advance during a portion only of each full rotation of the drive shaft.

8. In apparatus for dispensing liquid from sealed cans, an endless conveyor equipped to move sealed cans one by one to an opening station, a reciprocable can punch, a supporting frame mountable at such station, the can punch being carried by the frame together with punch operating means, said operating means comprising a drive shaft, a motor therefor, a punch cam fast on the shaft, and a punch actuating lever pivotally supported on the frame with one end in thrusting relation to the punch and the opposite end disposed in the cam path, the cam being shaped and arranged to effect in-thrusting operation and opposite release of the punch during a portion only of each full rotation of the drive shaft.

9. In apparatus for dispensing liquid from sealed cans, an endless conveyor equipped to move sealed cans one by one an an opening station, a reciprocable can punch at such station, a supporting frame, and operating means for the conveyor and for the punch carried by the frame, said means comprising a common drive shaft of which one rotation defines an operating cycle, a motor connected to drive the shaft, a combined crank and cam element fixed on the shaft, intermittent drive connections between said element and the conveyor to accord a determined advance to the conveyor during a first portion of each operating cycle, and a punch actuator movable on the frame and having an operating portion disposed in the path of the crank-cam element for in-thrusting and opposite release of the punch thereby during a second portion of the operating cycle, the drive shaft thereafter having a further rotation to complete one operating cycle.

10. Liquid dispensing apparatus comprising a chamber, means to advance seriatim full sealed cans to an opening station therein, means to open and permit drainage of cans as presented at the station, a collecting reservoir in the chamber receiving the liquid so drained, means subject to coin control to dispense measured liquid units from the reservoir, detector means to initiate a can advancing and opening cycle on depletion of the reservoir liquid, and a timer to shut down the machine on failure of liquid replenishment in the course of a successive plurality of such cycles.

11. In apparatus for dispensing liquid from serially presented sealed cans from which the liquid is drained to a reservoir subject to vending, in combination with means to advance and puncture a can, a collecting reservoir for the liquid from the punctured can, means for determining depletion of liquid in the reservoir, a motor to operate the can advancing and puncturing means, relay means controlled by the depletion determining means to start the motor, single-cycle seal-in and cut-off switch means for cycling the motor, and other switch means operable to stop the motor and shut down the apparatus upon exhaustion of the supply of liquid-containing sealed cans for the advancing and puncturing means.

12. In apparatus for dispensing liquid from serially presented sealed cans from which the liquid is drained to a reservoir subject to vending, in combination with means to advance and puncture a can, a collecting reservoir for the liquid from the punctured can, means for indicating depletion of liquid in the reservoir, a motor to operate the can advancing and puncturing means, relay means controlled by the indicating means to start the motor, single-cycle seal-in and cut-off switch means for cycling the motor, and other switch means in the motor circuit operable to stop the motor and shut down the apparatus in the event of continued liquid depletion in the reservoir through malfunctioning of the can advancing and puncturing means.

13. In apparatus for dispensing unit quantities of liquid, a liquid supply pot of multiple unit capacity, a dispensing receiver spaced below the pot, a vertical tubular open-end stationary measuring chamber of unit capacity between and in closed communication at its upper and lower ends respectively with the pot and with the dispensing receiver, an elongated actuator vertically disposed in the chamber and the pot, lower and upper valve members fixed on the actuator near the respective ends of the chamber, said members cooperable directly with the respective chamber ends and spaced to close the lower and open the upper chamber ends in up position of the actuator and the reverse in down position thereof, spring means normally holding the actuator and valve members in up position regardless of the liquid quantity in the chamber and pot, and electromagnetic means operable on dispensing call to depress the actuator thereby to open the chamber lower end completely circumferentially so as to deliver to the dispensing receiver one unit quantity of the liquid while retaining the remainder thereof in the pot, the actuator being tubular and being provided with radial venting ports at the lower portion between the valve members and at an upper portion above the maximum liquid level in the pot.

14. In apparatus for dispensing unit quantities of liquid, a liquid supply pot of multiple unit capacity, a dispensing receiver spaced below the pot, a vertical tubular open-end stationary measuring chamber of unit capacity between and in closed communication at its upper and lower ends respectively with the pot and with the dispensing receiver, an elongated actuator vertically disposed in the chamber and the pot, lower and upper valve members fixed on the actuator near the respective ends of the chamber, said members cooperable directly with the respective chamber ends and spaced to close the lower and open the upper chamber ends in up position of the actuator and the reverse in down position thereof, spring means normally holding the actuator and valve members in up position regardless of the liquid quantity in the chamber and pot, and electromagnetic means operable on dispensing call to depress the actuator thereby to open the chamber lower end completely circumferentially so as to deliver to the dispensing receiver one unit quantity of the liquid while retaining the remainder thereof in the pot, the measuring chamber being removably seated on the dispensing receiver and being integrally connected to the pot and positions and supports the latter, together with lateral positioning means releasably engaging the pot, whereby the pot and measuring chamber are bodily removable as a unit.

15. In apparatus for dispensing unit quantities of liquid, a liquid supply pot of multiple unit capacity, a dispensing receiver spaced below the pot, a vertical tubular open-end stationary measuring chamber of unit capacity between and in closed communication at its upper and lower ends respectively with the pot and with the dispensing receiver, an elongated actuator vertically disposed in the chamber and the pot, lower and upper valve members fixed on the actuator near the respective ends of the chamber, said members cooperable directly with the respective chamber ends and spaced to close the lower and open the upper chamber ends in up position of the actuator and the reverse in down position thereof, spring means normally holding the actuator and valve members in up position regardless of the liquid quantity in the chamber and pot, and electromagnetic means operable on dispensing call to depress the actuator thereby to open the chamber lower end completely circumferentially so as to deliver to the dispensing receiver one unit quantity of the liquid while retaining the remainder thereof in the pot, the liquid pot having a removable lid apertured for passage of the actuator of the measuring chamber, the lid having a further aperture space from the actuator and formed for removable and electrically insulated seating thereat of a liquid-level detector element to be immersed in the liquid of the pot.

16. In apparatus for dispensing unit quantities of liquid, a liquid supply pot of multiple unit capacity, a dispensing receiver spaced below the pot, a vertical tubular open-end stationary measuring chamber of unit capacity between and in closed communication at its upper and lower ends respectively with the pot and with the dispensing receiver, an elongated actuator vertically disposed in the chamber and the pot, lower and upper valve members fixed on the actuator near the respective ends of the chamber, said members cooperable directly with the respective chamber ends and spaced to close the lower and open the upper chamber ends in up position of the actuator and the reverse in down position thereof, spring means normally holding the actuator and valve members in up position regardless of the liquid quantity in the chamber and pot, and electromagnetic means operable on dispensing call to depress the actuator thereby to open the chamber lower end completely circumferentially so as to deliver to the dispensing receiver one unit quantity of the liquid while retaining the remainder thereof in the pot, the lower valve member comprising a connector removably secured to the lower end of the actuator, a foot plate threaded on the connector and a chamber-engaging gasket on the foot plate.

17. In apparatus for dispensing unit quantities of liquid, a liquid supply pot of multiple unit capacity, a dispensing receiver spaced below the pot, a vertical tubular open-end stationary measuring chamber of unit capacity between and in closed communication at its upper and lower ends respectively with the pot and with the dispensing receiver, an elongated actuator vertically disposed in the chamber and the pot, lower and upper valve members fixed on the actuator near the respective ends of the chamber, said members cooperable directly with the respective chamber ends and spaced to close the lower and open the upper chamber ends in up position of the actuator and the reverse in down position thereof, spring means normally holding the actuator and valve members in up position regardless of the liquid quantity in the chamber and pot, and electromagnetic means operable on dispensing call to depress the actuator thereby to open the chamber lower end completely circumferentially so as to deliver to the dispensing receiver one unit quantity of the liquid while retaining the remainder thereof in the pot, the upper valve member comprising an attaching element surrounding and secured to the actuator and having a shoulder and a lower threaded portion, a pair of top plates and an interposed chamber-engaging upper gasket underlying said shoulder, and a disc below the gasket and having a threaded collar received on the threaded lower portion of the attaching element for clamping the plates and gasket upwardly against said shoulder of the attaching element.

References Cited in the file of this patent

UNITED STATES PATENTS

| | | |
|---|---|---|
| 419,162 | Wagner | Jan. 7, 1890 |
| 1,325,983 | Togy | Dec. 13, 1919 |
| 1,469,398 | Street | Oct. 2, 1923 |
| 1,740,186 | Lippold | Dec. 17, 1929 |
| 2,307,589 | Johnson | Jan. 5, 1943 |
| 2,462,019 | Bowman | Feb. 15, 1949 |
| 2,475,511 | Nicholson | July 5, 1949 |
| 2,548,241 | Reynolds | Apr. 10, 1951 |
| 2,565,084 | Parks | Aug. 21, 1951 |
| 2,583,461 | Arnett | Jan. 22, 1952 |
| 2,609,982 | Johnson | Sept. 9, 1952 |